United States Patent
Naritomi et al.

(10) Patent No.: US 9,027,526 B2
(45) Date of Patent: May 12, 2015

(54) THREE-CYLINDER ENGINE

(75) Inventors: Tadakazu Naritomi, Kouza-gun (JP); Tamae Kobayashi, Atsugi (JP); Shigeatsu Saka, Tsu (JP); Hiroo Aoki, Obu (JP)

(73) Assignees: Nissan Motor Co., Ltd., Yokohama (JP); Aichi Machine Industry Co., Ltd., Nagoya (JP)

( * ) Notice: Subject to any disclaimer, the term of this patent is extended or adjusted under 35 U.S.C. 154(b) by 271 days.

(21) Appl. No.: 13/510,600

(22) PCT Filed: Nov. 25, 2010

(86) PCT No.: PCT/JP2010/071026
§ 371 (c)(1),
(2), (4) Date: Jul. 5, 2012

(87) PCT Pub. No.: WO2011/065426
PCT Pub. Date: Jun. 3, 2011

(65) Prior Publication Data
US 2012/0272933 A1 Nov. 1, 2012

(30) Foreign Application Priority Data

Nov. 26, 2009 (JP) ................................ 2009-268238

(51) Int. Cl.
*B60W 30/20* (2006.01)
*B60K 5/12* (2006.01)
(Continued)

(52) U.S. Cl.
CPC ............... *B60K 5/1216* (2013.01); *F16F 15/31* (2013.01); *B60W 30/20* (2013.01); *F02B 75/06* (2013.01); *F02B 2075/1812* (2013.01); *F16F 15/283* (2013.01); *F16F 15/322* (2013.01)

(58) Field of Classification Search
CPC ......... B60W 30/20; F02B 75/06; F16F 15/24; F16F 15/26; F16F 15/31; F16F 15/283; F16F 15/286

USPC ............................................. 123/192.1, 192.2
See application file for complete search history.

(56) References Cited

U.S. PATENT DOCUMENTS

| 5,435,059 A * | 7/1995 | Chawla ..................... 29/888.08 |
| 7,328,767 B2 | 2/2008 | Mori et al. |
| 2007/0107972 A1 | 5/2007 | Sakamaki |

FOREIGN PATENT DOCUMENTS

| CN | 1672970 A | 9/2005 |
| CN | 1967011 A | 5/2007 |

(Continued)

OTHER PUBLICATIONS

An English translation of the Russian Decision on Grant for the corresponding Russian Application No. 2012126557, issued on Aug. 20, 2013.

(Continued)

*Primary Examiner* — Lindsay Low
*Assistant Examiner* — Jacob Amick
(74) *Attorney, Agent, or Firm* — Global IP Counselors, LLP

(57) ABSTRACT

A three cylinder engine includes a vibration alleviation unit for alleviating vibrations in a vehicle. The vibration alleviation unit is disposed at least one of upon the crankshaft and upon a part that operates in unison with the crankshaft. The three cylinder is supported by engine mounts that are positioned upon at least both ends of the engine in the direction of the crankshaft axis. Given that $K_V$ and $K_H$ represent spring constants of one of the engine mounts in the pitch and yaw directions of the crankshaft, $M_V$ and $M_H$ represent components of a primary couple that occurs in the three cylinder engine in the pitch and yaw directions, and $M_{V0}$ represents the sum of $M_V$ and $M_H$, then spring constants of the engine mounts are set such that $K_V > K_H$ and the vibration alleviation unit is set so as to satisfy the condition $0 < M_V/M_{V0} < 0.5$.

9 Claims, 10 Drawing Sheets

(51) Int. Cl.
*F16F 15/31* (2006.01)
*F02B 75/06* (2006.01)
*F16F 15/28* (2006.01)
*F16F 15/32* (2006.01)
*F02B 75/18* (2006.01)

(56) References Cited

FOREIGN PATENT DOCUMENTS

| | | |
|---|---|---|
| DE | 3402100 A1 | 8/1985 |
| JP | 6-313463 | 11/1994 |
| JP | 11-11159 | 1/1999 |
| JP | 3584684 B2 | 8/2004 |
| JP | 2006-175894 | 7/2006 |
| JP | 2006175894 A * | 7/2006 |
| JP | 2007-313924 | 12/2007 |
| RU | 54120 U1 | 6/2006 |

OTHER PUBLICATIONS

An English translation of the Japanese Notification of Rejection Reasons of corresponding Japanese Application No. 2011-543296, issued on Apr. 23, 2013.

International Search Report of PCT/JP2010/071026, dated Feb. 10, 2011, mailed Feb. 22, 2011.

Chinese Office Action for the corresponding Chinese patent application No. 201080052652.X issued on May 5, 2014.

\* cited by examiner

2···CRANKSHAFT
3···COUNTERWEIGHT
6···BALANCE MASS
7···BALANCE MASS

THREE-CYLINDER ENGINE

CROSS-REFERENCE TO RELATED APPLICATIONS

This application is a U.S. National stage application of International Application No. PCT/JP2010/071026, filed Dec. 14, 2010, which claims priority claims priority under to Japanese Patent Application No. 2009-268238, filed in Japan on Nov. 26, 2009, the entire contents of which is hereby incorporated by reference.

BACKGROUND OF THE INVENTION

1. Field of the Invention

The present invention generally relates to three cylinder engine.

2. Background Information

Japanese Laid-Open Patent Application (Tokkai) 2006-175894 discloses a three cylinder engine that is constructed to make a component of a primary couple in a crankshaft axis pitch direction substantially zero by using weights that reduce a couple produced upon reciprocating movement of moving parts including pistons.

SUMMARY

However, in the technique of Patent document 1, in order to make the component of the primary couple in the crankshaft axis pitch direction substantially zero, the weights are relatively heavy, which tends to bring about an increased weight of the engine.

Accordingly, in the present invention, given that $K_V$ represents a spring constant of at least one of the engine mounts in a crankshaft axis pitch direction, $K_H$ represents a spring constant of the engine mount in a crankshaft axis yaw direction, $M_V$ represents a component (pitch moment) of a primary couple produced by the three cylinder engine in the crankshaft axis pitch direction, $M_H$ represents a component (yaw moment) of the primary couple produced by the three cylinder engine in the crankshaft axis yaw direction, and $M_{V0}$ represents a sum of $M_V$ and $M_H$, then the spring constants are set such that $K_V > K_E$ and a vibration alleviating unit is set in a crankshaft system (the crankshaft and a part that operates in unison with the crankshaft) vibration alleviation unit such that $0 < M_V / M_{V0} < 0.5$.

In the three cylinder engine, there is usually produced an unbalanced couple of forces between a force in a pitch direction and a force in a yaw direction, which tends to cause the engine to make a processional movement. Such unbalanced couple becomes a cause of vibration when the engine is mounted in a vehicle. In the present invention, $K_V > K_H$ is established and the crankshaft system is provided with a vibration alleviation unit so as to satisfy the condition $0 < M_V / M_{V0} < 0.5$ and make a yaw vibration of the entire engine larger than a pitch vibration, thereby reducing the vehicle vibration as a whole while suppressing the weight of the vibration alleviation unit.

BRIEF DESCRIPTION OF THE DRAWINGS

Referring now to the attached drawings which form a part of this original disclosure.

DETAILED DESCRIPTION OF THE EMBODIMENTS

In the following, embodiments of the present invention will be described with reference to the drawings.

Figure 1:
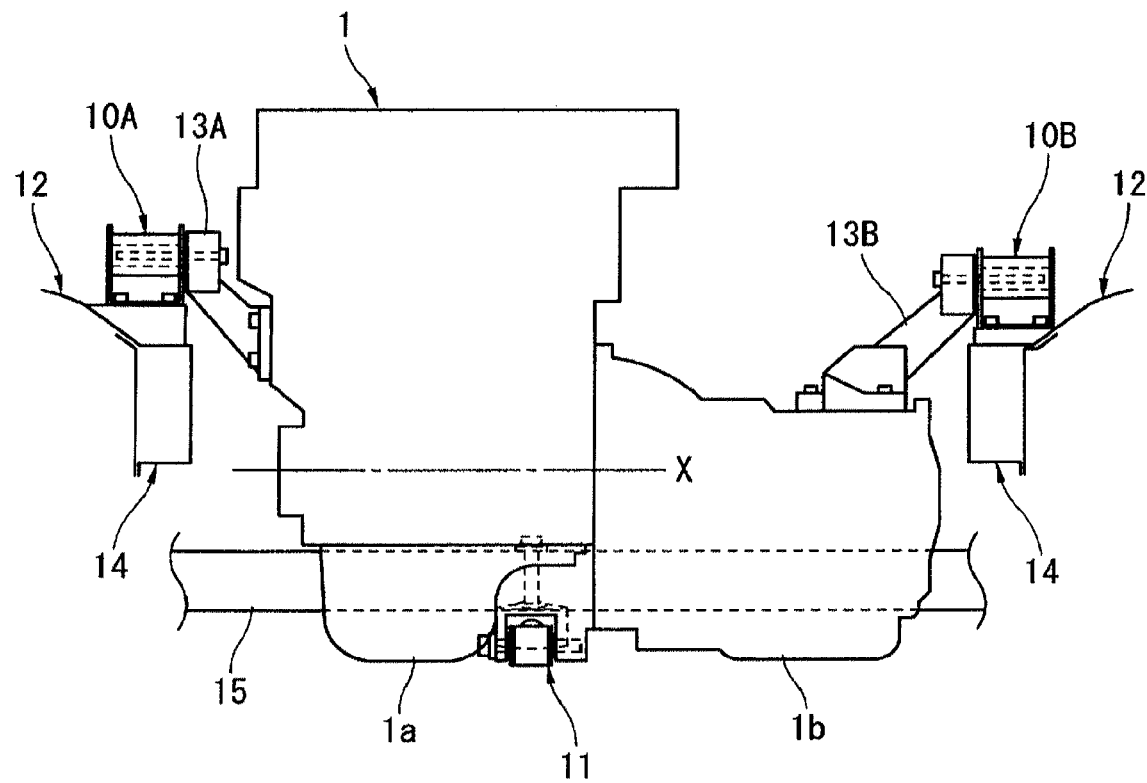
FIG. 1 is a front view of a mounting structure a three cylinder engine according to the present invention in a vehicle.
Figure 2:
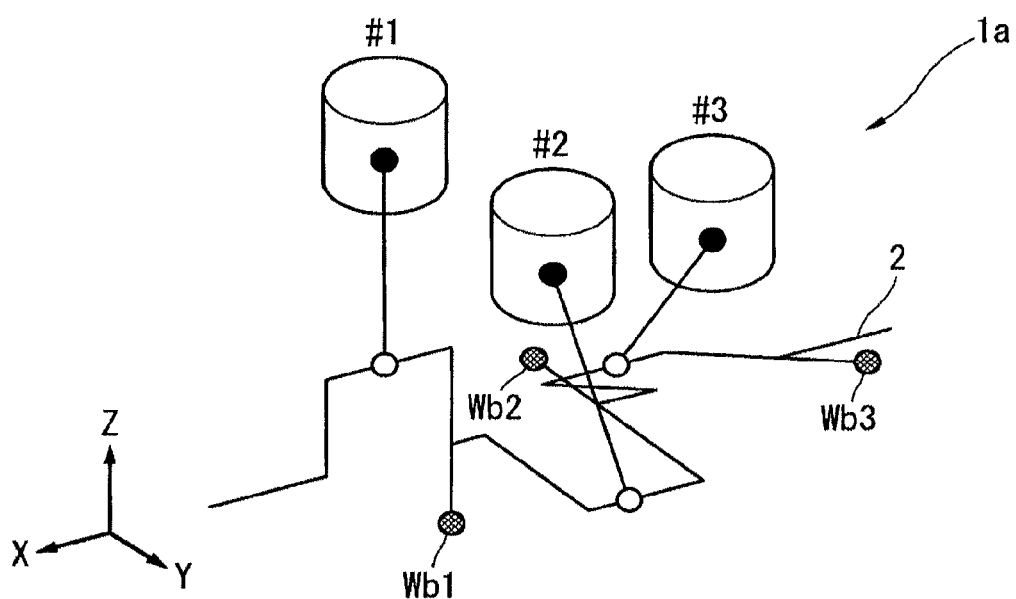
FIG. 2 is a perspective view schematically illustrating key portions of the three cylinder engine according to the present invention.

FIG. 1 is a front view of a mounting structure of a three cylinder engine according to the present invention mounted in a vehicle, and FIG. 2 is a perspective view schematically illustrating key portions of a main movement system of a three cylinder engine 1 to which the invention is applied.

An engine unit 1 comprises a three cylinder in-line engine 1a and a transmission 1b, and is supported on a vehicle body 12 through a plurality of supporting members such as engine mounts 10A and 10B and a torque rod 11.

In the embodiment, the engine unit 1 is transversely mounted on the vehicle body in such a manner that a crankshaft 2 of the engine 1a extends in the direction of the width of the vehicle.

In this specification, a plurality of movement directions (viz., pitch direction, yaw direction, roll direction) of the engine unit 1 will be defined using a center axis (X-axis) of the crankshaft 2 as a reference. More specifically, the direction around a Y-axis (viz., an axis extending in a fore-and-aft direction of the vehicle) that is perpendicular to the crankshaft axis and extends horizontally will be defined as the pitch direction, the direction around Z-axis that is perpendicular to the crankshaft axis and extends in an up-and-down direction will be defined as the yaw direction and the direction around the crankshaft axis will be defined as the roll direction.

Each of both ends of the engine unit 1 in the direction of the crankshaft axis is provided with a bracket 13A or 13B. Specifically, the bracket 13A is positioned above the crankshaft 2 and provided on a lateral end face of a vehicle widthwise end portion of the engine 1a, and the other bracket 13B is provided on an upper end face of a vehicle widthwise end portion of the transmission 1b. Each of the brackets 13A or 13B is connected to a corresponding one of the engine mounts 10A and 10B by means of a bolt or the like. That is, the engine unit 1 is supported on the vehicle body 12 through the engine mounts 10A and 10B that are arranged at both ends of the engine 1a along the direction of the crankshaft axis. The engine mounts 10A and 10B are respectively attached to front side members 14 that extend in a fore-and-aft direction of the vehicle along both sides of a front space (viz., engine room) of the vehicle body.

In this embodiment, a spring constant $K_V$ of each of the engine mount 10A in an up-and-down direction (which corresponds to the crankshaft axis pitch direction) of the vehicle is set larger than a spring constant $K_H$ of the same in a fore-and-aft direction (which corresponds to the crankshaft axis yaw direction). That is, by making the spring constant $K_V$ in the up-and-down direction of the vehicle comparatively large, the engine unit 1, which has a large mass, can be supported more stably and durability of the engine mount 10A can be improved. Additionally, since a resonance frequency in an up-and-down direction of the vehicle due to provision of the engine unit 1 and the engine mounts 10A and 10B is increased, the riding comfort of the vehicle can be improved by decreasing the up-and-down shaking of the engine. Moreover, by decreasing the spring constant $K_H$ in the fore-and-aft direction of the vehicle, attenuation of the vibration in such direction is increased. It is to be noted that the spring constant can be suitably adjusted by changing shape and material of a resilient member (not shown) that is used in the engine mount 10A and made of a resilient body such as rubber material or the like.

The torque rod 11 is positioned below the crankshaft 2 and arranged to support the engine unit 1 on a front cross member 15 that extends in a widthwise direction of the vehicle in a lower portion of a front space of the vehicle body, and thus the torque rod 11 functions to mainly restrain the movement of the engine unit 1 in the roll direction.

If, among transfer sensitivities of vibration from the engine mount 10A to a floor of the vehicle, a transfer sensitivity in the crankshaft axis pitch direction (viz., the up-and-down direction of the vehicle) is represented by $H_V$ and a transfer sensitivity in the crankshaft axis yaw direction (viz., the fore-and-aft direction of the vehicle) is represented by $H_H$, the relation "$H_V > H_H$" is usually established because the vehicle body is longer in a fore-and-aft direction and moves more readily in response to input oriented in an up-and-down direction than input oriented in a fore-and-aft direction at the position of the engine mount 10A. Denoted by references Wb1 to Wb3 in FIG. 2 are a plurality of counterweights 3 (see FIG. 4 which will be explained hereinafter) schematically depicted as point masses, which constitute a part of a balance weight (viz., vibration alleviation unit) that cancels a force produced due to reciprocating movement of moving portions including pistons.

If, in case of a three cylinder engine, an unbalanced pitch moment is produced due to a primary couple of forces produced under reciprocating movement of moving portions including pistons, a pitch vibration of the engine can be reduced by adding a counterweight to a balance mass, for example, so as to produce a pitch moment that has a phase reversed to that of the unbalanced pitch moment. However, although the pitch vibration is suppressed, a yaw vibration is produced and the engine 1 undergoes a so-called processional movement.

Figure 3:
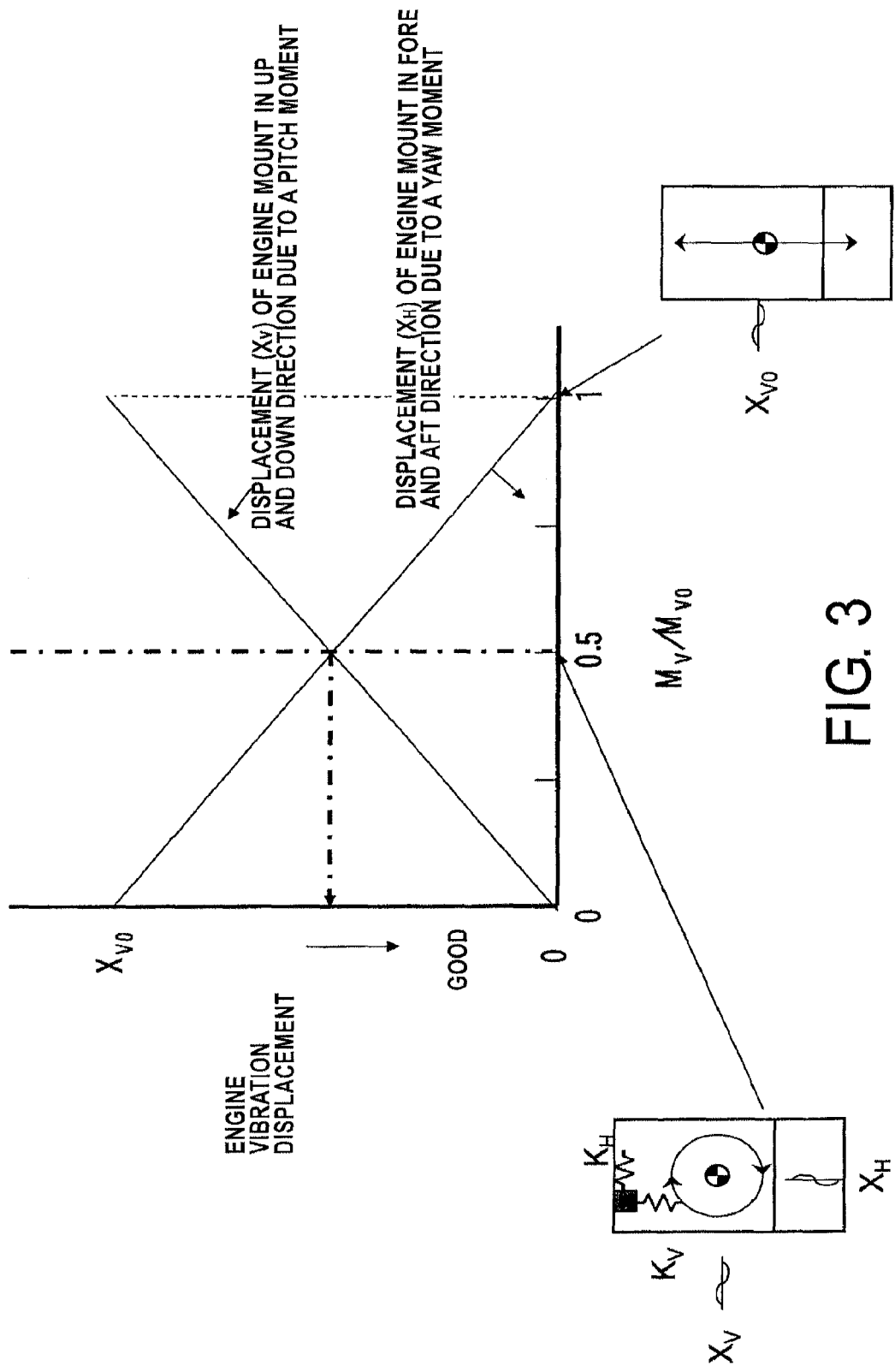
FIG. 3 is a diagram schematically illustrating a conventional approach to balance mass adjustment.

If now the balance weight is so adjusted (see solid line of FIG. 5 that will be described hereinafter) as to equalize a pitch moment produced by the engine 1a, i.e., a component $M_V$ of a primary couple produced by the engine 1a oriented in the crankshaft axis pitch direction, with a yaw moment produced by the engine, i.e., a component $M_H$ of the primary couple produced by the engine 1a oriented in the crankshaft axis yaw direction, then the equation $M_V/M_{V0}=0.5$ is established as is shown in FIG. 3, which improves the vibration displacement of the engine 1a. $M_{V0}$ is the sum of the pitch moment $M_V$ and the yaw moment $M_H$ (viz., $M_{V0}=M_V+M_H$).

While, in the embodiment, considering that the condition $K_V > K_H$ is set and $H_V > H_H$ is generally satisfied, further reduction of the vehicle vibration is realized by setting a balance weight of a crankshaft system (viz., the crankshaft and portions that rotate as an integral unit with the crankshaft) in such a manner that the yaw vibration of the engine 1a is larger than the pitch vibration.

Figure 4:
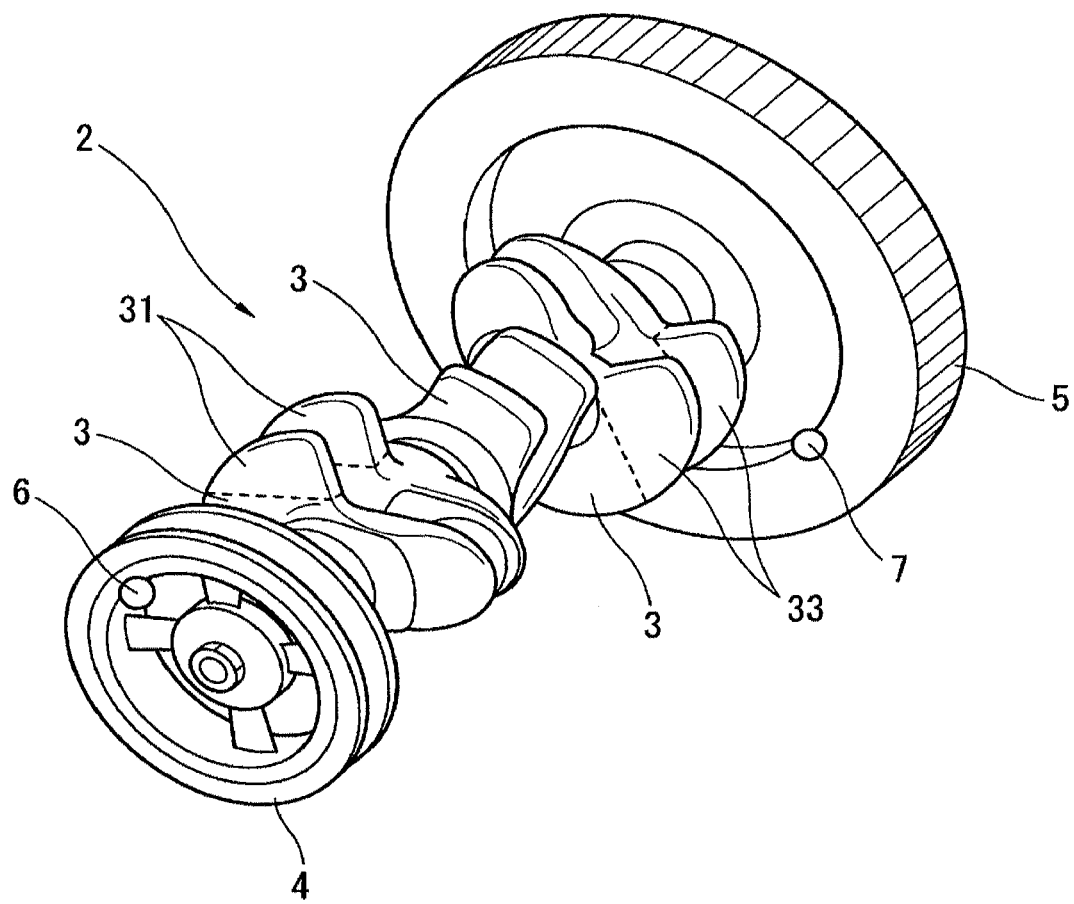
FIG. 4 is a perspective view more concretely illustrating the key portions of the three cylinder engine of the present invention while showing one example of a way to attach balance masses.

More specifically, as shown in FIG. 4, among the counterweights 3, additional weights 31 and 33 are added to the counterweights 3 corresponding to the #1 and #3 cylinders of the engine, and a pair of balance masses 6 and 7 each constituting part of a balance weight are respectively provided on a crank pulley 4 and a drive plate 5 which rotate as an integral unit with the crankshaft 2, so that $0<M_V/M_{V0}<0.5$ is established. It is to be noted that in the embodiment, the additional weights 31 and 33 and the balance masses 6 and 7 are arranged at positions displaced by 90 degrees with respect to a rotation phase of the #2 cylinder under rotation of the crankshaft 2, and the additional weights 31 and 33 and the balance masses 6 and 7 are arranged in positions spaced from each other by 180 degrees in terms of crank angle.

Figure 5A:
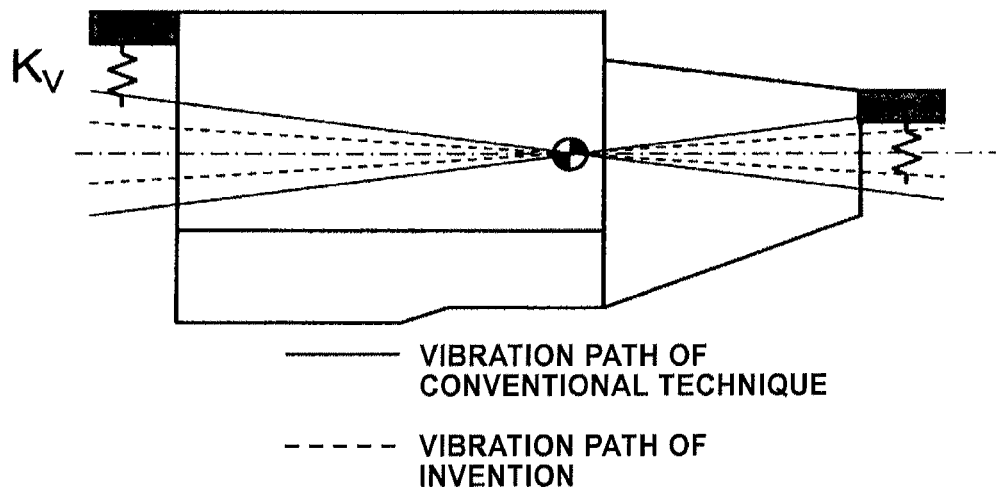
FIG. 5A is a front view of the three cylinder engine taken from in front of the vehicle, which schematically illustrates the state of a vibration occurring when the present invention is applied to a three cylinder engine mounted transversely in a vehicle.
Figure 5B:
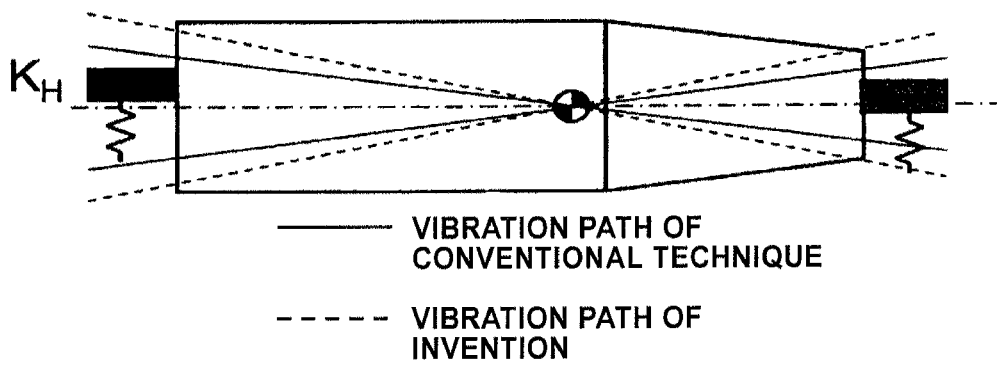
FIG. 5B is a plan view of the three cylinder engine, which schematically illustrates the state of a vibration occurring when the present invention is applied to a three cylinder engine mounted transversely in a vehicle.
Figure 5C:
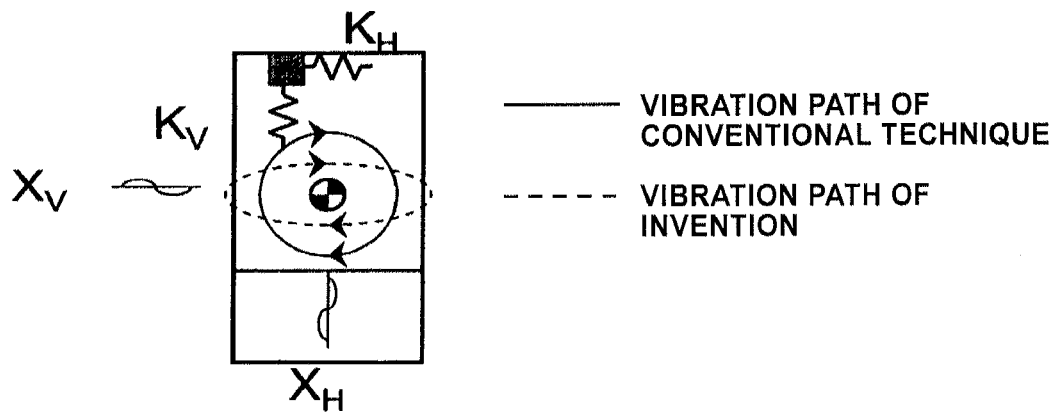
FIG. 5C is a side view of the three cylinder engine taken from a side of the vehicle, which schematically illustrates the state of a vibration occurring when the present invention is applied to a three cylinder engine mounted transversely in a vehicle.
Figure 6:
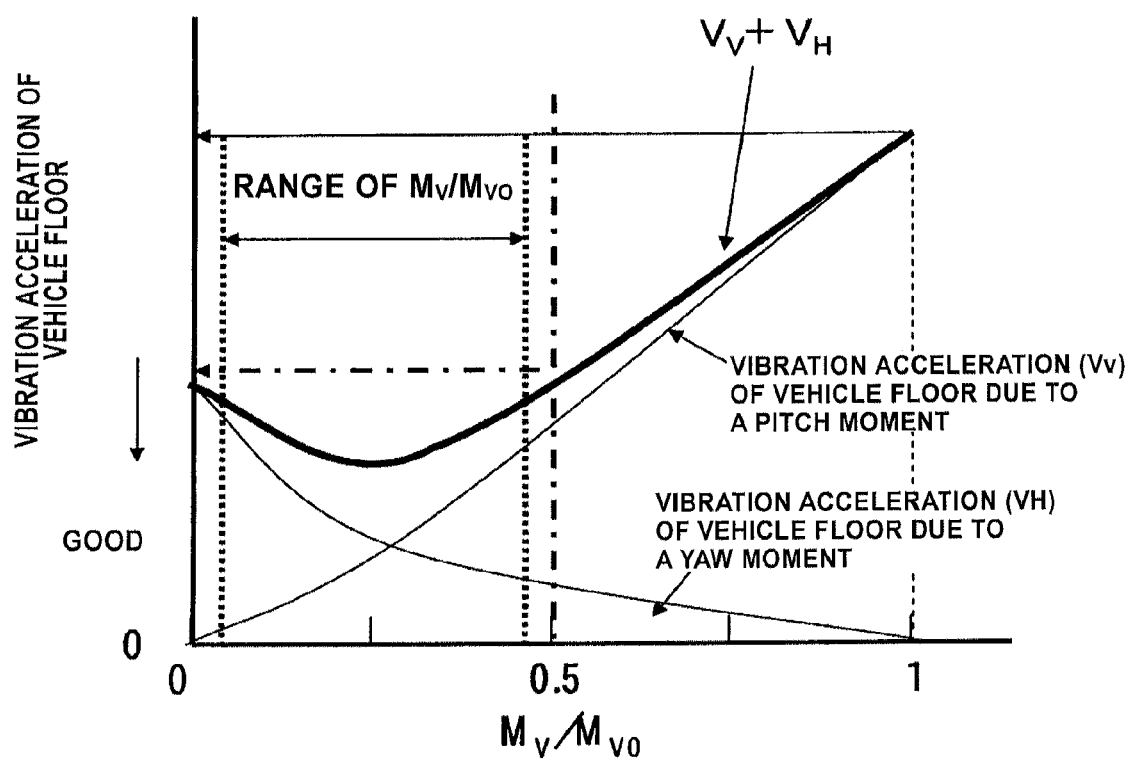
FIG. 6 is a diagram illustrating a setting range for a balance weight of a crankshaft system of the three cylinder engine of the present invention.

Thus, even though the yaw vibration becomes higher than the pitch vibration as shown in FIGS. 5A to 5C (see the broken line in FIGS. 5 A to 5C), a vehicle floor vibration acceleration caused by the vibration through the engine mount 10A is reduced on the whole as is seen from FIG. 6. In other words, by adjusting the additional weights 31 and 33 and the balance masses 6 and 7 connected to the crank pulley 4 and the drive plate 5 in such a manner as to make the yaw moment larger than the pitch moment produced by the engine 1a, the vehicle vibration can be reduced as a whole while restraining an increase of weight of the balance weight. With this, particularly, a vehicle vibration level during idling of the engine can be reduced. Since the primary couple produced by the engine is a force that is produced by an inertial force of moving portions including pistons, the vehicle body vibration during idling is not changed largely by the engine speed. However, the sensitivity of a human being to a vibration becomes high as the vibration frequency becomes low (that is, the engine speed becomes low). Accordingly, by reducing the vehicle body vibration level under idling of the vehicle, it becomes possible to reduce the engine speed during idling and thus, it becomes possible to improve the fuel consumption during the idling. The line $V_V$ of FIG. 6 depicts an acceleration of a vehicle floor vibration resulting from a vibration that is caused by the pitch moment produced by the engine 1a and transferred through the engine mount 10A, and the line $V_H$ of the drawing depicts an acceleration of a vehicle floor vibration resulting from a vibration that is caused by the yaw moment produced by the engine 1a and transferred through the engine mount 10A.

Assuming now that a displacement in an up-and-down direction of engine mount 10A caused by the pitch moment produced by the engine 1a is represented by $X_V$ and a displacement in a fore-and-aft direction of the engine mount 10A caused by the yaw moment produced by the engine 1a is represented by $X_H$, the values $V_V$ and $V_H$ are expressed by $V_V = X_V \times K_V \times H_V$ and $V_H = X_H \times K_H \times H_H$. Since $K_V > K_H$ and $H_V > H_H$ are satisfied, the sensitivity to the vehicle floor vibration acceleration is higher with respect to the displacement $X_V$ in the up-and-down direction of the engine mount 10A than with respect to the displacement $X_H$ in the fore-and-aft direction of the engine mount.

Accordingly, as is seen from FIG. 6, the value $V_V$ occurring when $M_V/M_{V0}=1$ (that is, $M_H=0$) is greater than the value of $V_H$ occurring when $M_V/M_{V0}=0$ (that is, $M_V=0$). Accordingly, as is seen from FIG. 6, the vehicle floor vibration acceleration $V_V+V_H$, which results from a vibration that is caused by the pitch moment and yaw moment produced by the engine 1a and transferred through engine mount 10A, exhibits a minimum value in the range $0<M_V/M_{V0}<0.5$ and is smaller in that range than in the range $0.5 \leq M_V/M_{V0} \leq 1$.

Regarding a vehicle floor vibration acceleration resulting from a vibration that is caused by the pitch moment and yaw moment produced by the engine 1a and transferred through the engine mount 10B, the exact same thing can be said as has been explained regarding the vehicle floor vibration acceleration caused by the vibration transferred through the engine mount 10A, and the vehicle floor vibration acceleration $V_V+V_H$ caused by the vibration transferred through the engine mount 10B exhibits a minimum value in the range $0<M_V/M_{V0}<0.5$ and is smaller in that range than in the range $0.5 \leq M_V/M_{V0} <1$. Accordingly, when the balance masses of the crank pulley 4 and the drive plate 5 are so adjusted as to make the yaw moment larger than the pitch moment produced by the engine 1a (viz., $0<M_V/M_{V0}<0.5$), the vehicle floor vibration can be reduced by only setting the spring constant of at least one of the engine mounts 10A and 10B such that $K_V > K_H$. When both the spring constants are set such that $K_V > K_H$, the effect of reducing the vehicle floor vibration can be enhanced even further. Next, the value of $M_V/M_{V0}$ at the minimum value (or smallest value) of $V_V+V_H$ will be derived. If a vibration angular acceleration in a pitch direction of the crankshaft caused by the vibration of the engine, a vibration angle amplitude, and a crankshaft rotation angular speed are represented by $A_V$, $Y_V$ and $\omega$, respectively, and a moment of inertia in a crankshaft axis pitch direction and a moment of inertia in a crankshaft yaw direction are represented by $I_V$ and $I_H$, respectively, then the value Av is represented by the following equation (1).

$$A_V = M_V/I_V \quad (1)$$

Since the value $A_V$ is a value provided by differentiating $Y_V$ twice by time, the value $Y_V$ is expressed by the following equation (2).

$$Y_V = -A_V/\omega \quad (2)$$

From Equations (1) and (2), the value $Y_V$ is expressed by the following equation (3).

$$Y_V = -M_V/(\omega^2 \times I_V) \quad (3)$$

When now the distance from the center of gravity of the engine unit 1 to the engine mount 10A as viewed from the front of vehicle is represented by L, the value $X_V$ is expressed by the following equation (4).

$$X_V = L \times Y_V \quad (4)$$

From Equations (3) and (4), the value $X_V$ is expressed by the following equation (5).

$$X_V = \alpha \times (M_V/I_V)$$
$$(\alpha = -L/\omega^2) \quad (5)$$

Since $V_V = X_V \times K_V \times H_V$ as has been mentioned hereinabove, the following equations are derived based on this and Equation (5), namely $V_V = \alpha \times M_V \times K_V \times H_V/I_V$ and $M_V = (V_V \times I_V)/(\alpha \times K_V \times H_V)$. Similarly to this, $M_H = (V_H \times I_H)/(\alpha \times K_H \times H_H)$ is derived.

Accordingly, the value $M_V/M_{V0}$ is represented by the following equation (6).

$$M_V/M_{V0} = M_V/(M_V+M_H) = ((V_V \times I_V)/(K_V \times H_V))/((V_V \times I_V)/(K_V \times H_V)+(V_H \times I_H)/(K_H \times H_H)) \quad (6)$$

Since an equation $V_V = V_H$ is established when the value $V_V+V_H$ shows the smallest value (or minimum value), the value $M_V/M_{V0}$ at this time is represented by the following equation (7).

$$M_V/M_{V0} = (I_V \times K_H \times H_H)/(I_H \times K_V \times H_V + I_V \times K_H \times H_H) \quad (7)$$

Although the above derives the value $M_V/M_{V0}$ that causes the minimum value of the vehicle floor vibration acceleration $V_V+V_H$ resulting from a vibration that is caused by the pitch moment and yaw moment produced by the engine 1a and transferred through the engine mount 10A, exactly the same derivation can be made regarding the vehicle floor vibration acceleration resulting from a vibration transferred through the engine mount 10B.

Figure 7:
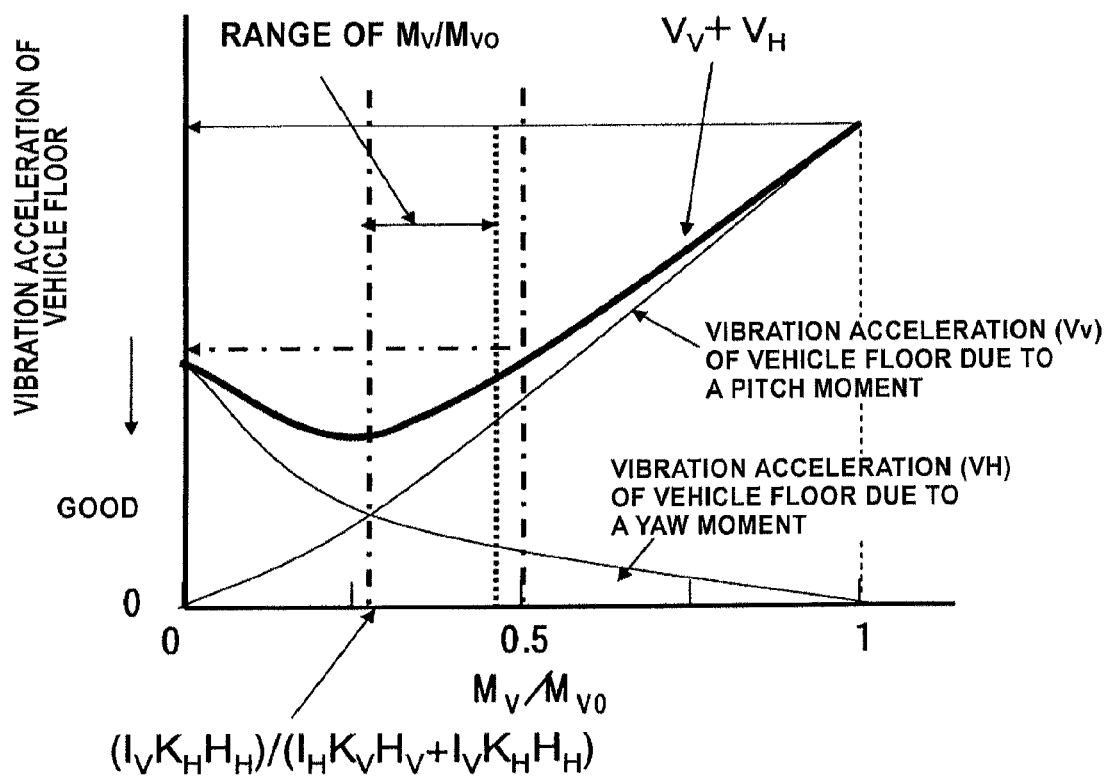
FIG. 7 is a diagram illustrating the setting range for the balance weight of the crankshaft system of the three cylinder engine of the present invention.

In the above-mentioned embodiment, the weights of the additional weights 31 and 33 and the weights of the balance masses 6 and 7 respectively provided on the crank pulley 4 and the drive plate 5 are so set as to establish the inequality $0<M_V/M_{V0}<0.5$. Thus, as the weights of such weight members increase, the value $M_V/M_{V0}$ reduces, and, thus, as is seen from FIG. 7, if, in engine mount 10A or engine mount 10B, the weights of the additional weights 31 and 33 and the weights of the balance masses 6 and 7 provided on the crank pulley 4 and the drive plate 5 are so set as to establish inequality $(I_V K_H H_H)/(I_H K_V H_V + I_V K_H H_H) \leq M_V/M_{V0} < 0.5$, then it is possible to reduce the vehicle floor vibration with a relatively small amount of balance masses.

Figure 8:
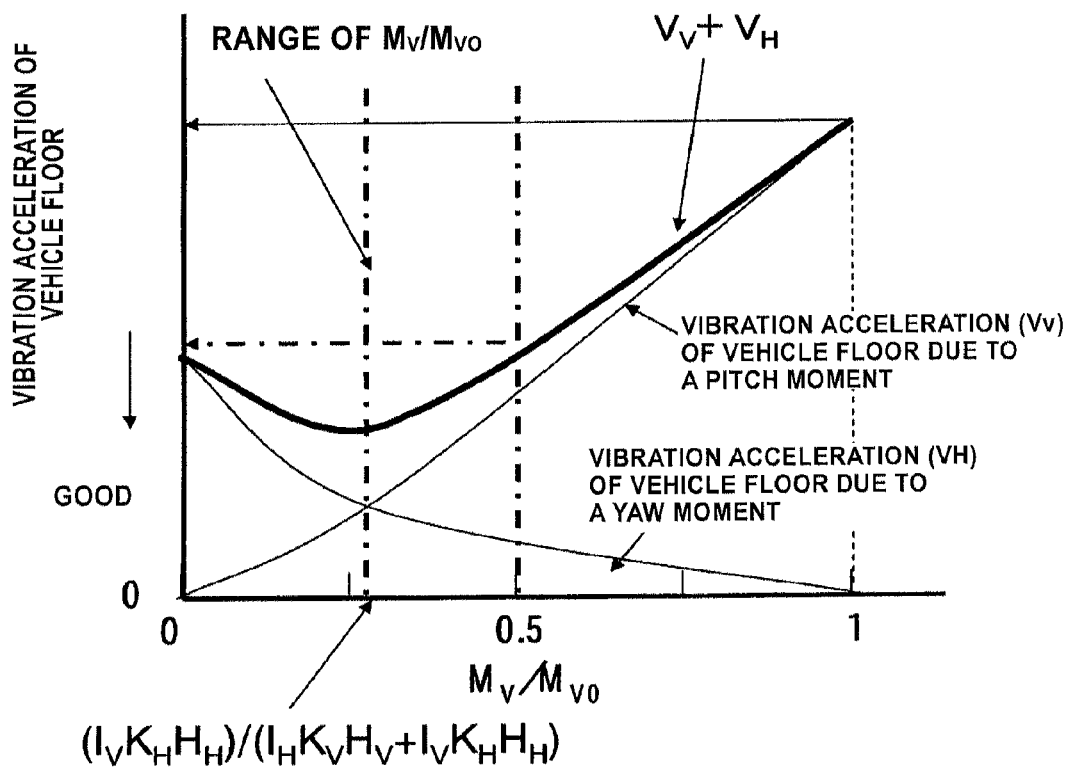
FIG. 8 is a diagram illustrating the setting range for the balance weight of the crankshaft system of the three cylinder engine of the present invention.

As is seen from FIG. 8, if the value $M_V/M_{V0}$ is set to the value $(I_V K_H H_H)/(I_H K_V H_V + I_V K_H H_H)$ at the engine mount 10A, then the vibration transferred to the vehicle floor through the engine mount 10A is minimized, and if the value $M_V/M_{V0}$ is set to the value $(I_V K_H H_H)/(I_H K_V H_V + I_V K_H H_H)$ at the engine mount 10B, then the vibration transferred to the vehicle floor through the engine mount 10B is minimized. Accordingly, if the weights of the balance masses 6 and 7 respectively connected to the crank pulley 4 and the drive plate 5 are so set as to cause the value $M_V/M_{V0}$ to take a value between the value $(I_V K_H H_H)/(I_H K_V H_V + I_V K_H H_H)$ corresponding to the engine mount 10A and the value $(I_V K_H H_H)/(I_H K_V H_V + I_V K_H H_H)$ corresponding to the engine mount 10B, then the vehicle floor vibration can be reduced even further.

Figure 9:
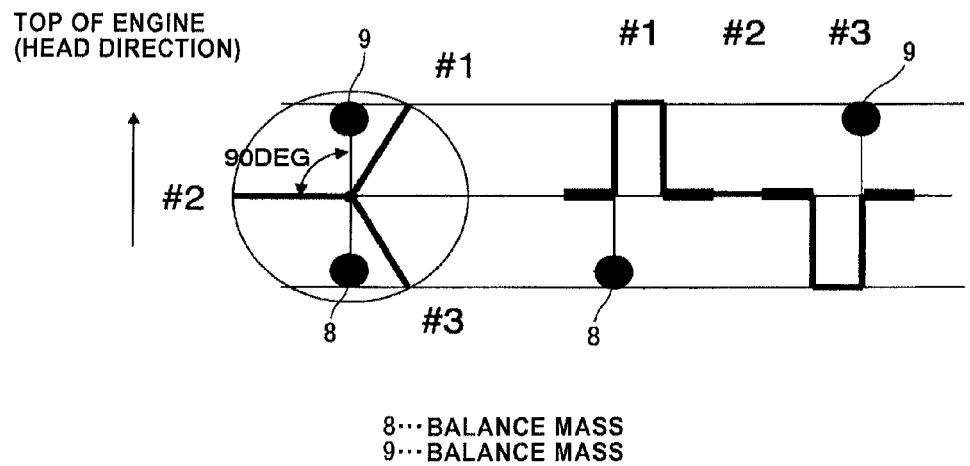
FIG. 9 is a diagram schematically illustrating another to attach balance masses in the three cylinder engine of the present invention.

In the above-mentioned embodiment, the counterweights 3 and two balance masses 6 and 7 provided on the crank pulley 4 and the drive plate 5, respectively, serve to adjust the balance weight of the engine 1a. However, if desired, as seen from FIG. 9, a balance weight of the engine 1a like the balance weight explained above can be achieved by arranging the balance masses 8 and 9 on the crankshaft at the positions of the #1 cylinder and the #3 cylinder, respectively. In this case, too, the two balance masses 8 and 9 are arranged at angular positions displaced by 90 degrees relative to a rotation phase of the #2 cylinder in rotation of the crankshaft 2 and the balance masses 8 and 9 are spaced from each other by 180 degrees in terms of the crank angle. Instead of arranging the balance masses 8 and 9, the additional weights 31 and 33 may be enlarged in size, which brings about the same effects. It is to be noted that FIG. 9 shows a three cylinder engine of which the firing order is #1 cylinder-#2 cylinder-#3 cylinder.

In the above-mentioned embodiment, further reduction of the vehicle vibration is achieved by providing the balance masses and the additional weights so as to adjust the balance weight that constitutes the vibration alleviation unit. However, the balance weight can also be adjusted in the manner of other embodiments that will now be explained. In the other embodiments that will now be explained, elements that are the same as those described in the above-mentioned embodiment are denoted by the same reference numerals and duplicated explanation on the elements will be omitted.

Figure 10:
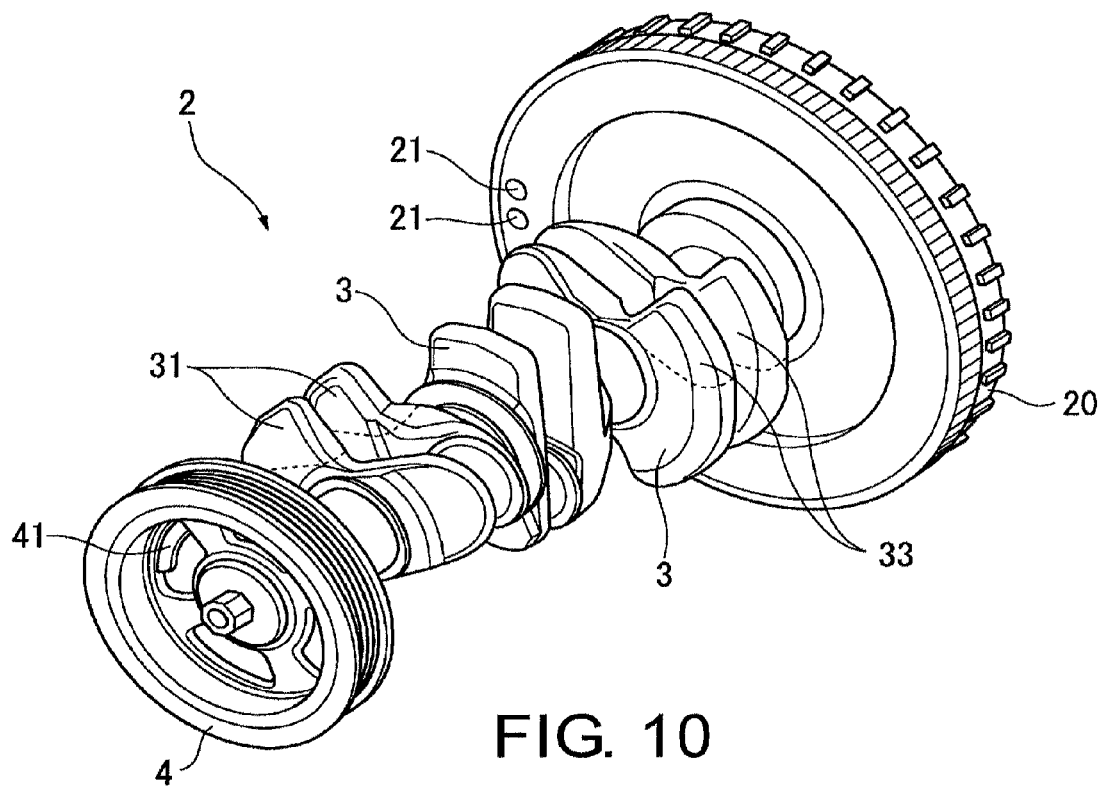
FIG. 10 is an illustration schematically illustrating a second embodiment of a three cylinder engine according to the present invention.

In a three cylinder internal combustion engine equipped with a manual transmission (not shown) according to a second embodiment of the present invention that is shown in FIG. 10, a flywheel 20 provided on one end portion of the crankshaft 2 has two through bores 21 and 21 that are formed adjacent to each other in a side face of a peripheral portion of the flywheel, are spaced from each other in a circumferential direction of the flywheel 20, and have equal diameters. Thus, the portion of the flywheel 20 where the bores 21 and 21 are provided is reduced in weight thereby inducing the same effects as those that would be obtained if balance masses were provided at positions spaced 180 degrees in crank angle away from the bores 21 and 21. That is, in the second embodiment, adjustment of the vibration alleviation unit is achieved by providing bores in the crankshaft system (viz., the crankshaft and the portions that rotate as integral unit with the crankshaft).

In the second embodiment, the crank pulley 4 provided on the other end portion of the crankshaft 2 is a cast part, and an inwardly projected plate-like balance mass 41 is formed integrally on an inner surface of the crank pulley 4 when the crank pulley 4 is cast.

A middle position between the balance mass 41 provided in the crank pulley 4 and the bores 21 and 21 provided in the flywheel 20 is arranged in a position offset by 90 degrees relative to a rotation phase of the #2 cylinder under rotation of the crankshaft 2, and the middle position between the balance mass 41 and the bores 21 and 21 is the same position in terms of crank angle as the position where the additional weights 31 are provided.

Although, in the above-mentioned second embodiment, the bores 21 are through bores that pierce through the flywheel 20, the bores 21 do not necessarily need to pierce through the flywheel 20. That is, a notch or other structure may be used so long as it reduces the weight. Furthermore, instead of providing bores 21 in the flywheel 20, a bolt or other member serving as a balance mass can be connected to the flywheel at a position separated by 180 degrees in terms of crank angle from the position where the bores 21 would be formed.

Figure 11:
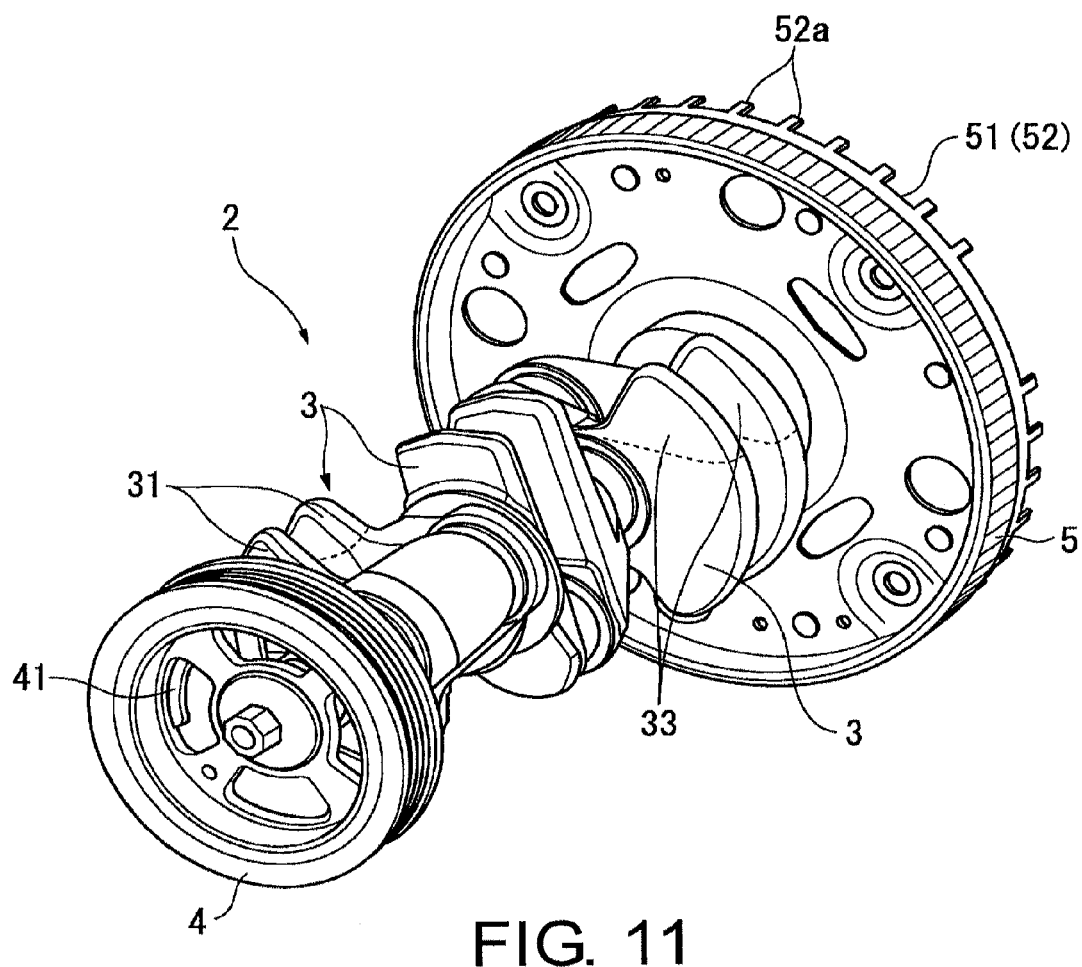
FIG. 11 is an illustration schematically illustrating a third embodiment of a three cylinder engine according to the present invention.
Figure 12:
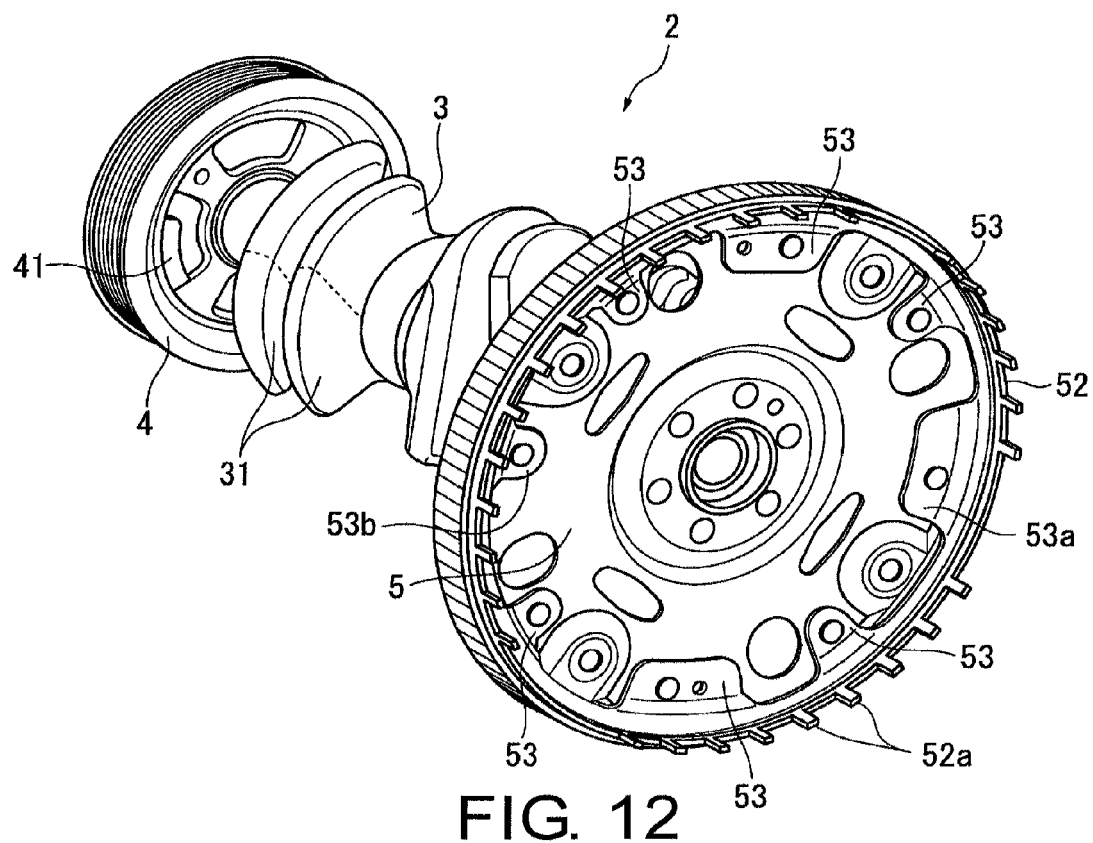
FIG. 12 is an illustration schematically illustrating the third embodiment of the three cylinder engine according to the present invention.

A third embodiment of the present invention will now be described with reference to FIGS. 11 and 12. In a three cylinder internal combustion engine equipped with an automatic transmission (not shown) according to this third embodiment, attachments fixed to the drive plate 5 are configured to have asymmetrical shapes such that the same effects are obtained as those obtained when balance masses are provided on the drive plate In this third embodiment, a signal plate 51 for detecting a rotation angle of the crankshaft 2 is attached to the drive plate 5, which is provided on one end portion of the crankshaft 2. The signal plate 51 comprises an annular main body portion 52 on which a plurality of teeth 52*a* are formed at intervals and a plurality (even number) of flange portions 53 that are formed to extend perpendicular to the main body portion 52 for fixing the signal plate 51 to the drive plate 5. The flange portions 53 are arranged in pairs spaced apart from each other by 180 degrees in terms of crank angle, and the shapes of the flange portions 53 making up each pair are the same except for one pair. Of this one pair, a flange portion 53*a* is configured to be larger than a flange portion 53*b* positioned 180 degrees away in terms of crank angle such that the flange portion 53*a* and the flange portion 53*b* are shaped differently from each other. That is, in this third embodiment, by making the shapes of one pair of the flange portions 53*a* and 53*b*, which are spaced apart from each other by 180 degrees in terms of crank angle, asymmetrical, the same effects are obtained as those that would be obtained if a balance mass were provided at the position of the flange portion 53*a*.

Like the above-mentioned second embodiment, the crank pulley 4 in the third embodiment is a cast part and a plate-like balance mass 41 is integrally cast to an inner surface of the crank pulley 4.

The balance mass 41 and each of the flange portions 53*a* and 53*b* are displaced by 90 degrees with respect to a rotation phase of the #2 cylinder under rotation of the crankshaft 2, and the balance mass 41 and the flange portion 53*a* are spaced from each other by 180 degrees in terms of crank angle.

In this third embodiment, by making the shapes of the paired flange portions 53*a* and 53*b*, which are two of the plurality of flanges 53 provided by the signal plate 51 and spaced from each other by 180 degrees in terms of crank angle, asymmetrical, there are obtained the same effects as those that would be obtained if a balance mass were provided on the drive plate 5. However, in case wherein the shape of the signal plate 51, which is an attachment fixed to the drive plate 5, is symmetrical (that is, in a case wherein all of the flange portions 53 of the signal plate 51 are configured such that flange portions 53 spaced apart from each other by 180 degrees in terms of crank angle are symmetrical), providing a through bore at a position corresponding to the aforementioned flange portion 53*b* of the drive plate 5 (that is, at a position that is displaced by 90 degrees with respect to the rotation phase of the #2 cylinder under rotation of the crank shaft 2 and is the same as the position of the balance mass 41 in terms of crank angle) brings about a reduction in weight of the portion where the bore is provided and induces the same effects as those that would be obtained if a balance mass were provided at a position that is spaced from the through bore by 180 degrees in terms of crank angle.

Figure 13:
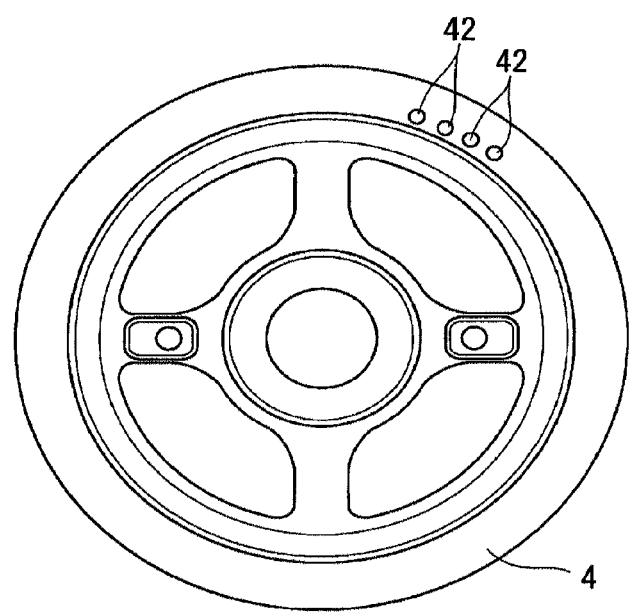
FIG. 13 is an illustration schematically illustrating a crank pulley employed in the other embodiment of the three cylinder engine according to the present invention.

In the above-mentioned embodiments, there is employed an arrangement in which the crank pulley 4 is provided with balance masses. However, as is seen from FIG. 13, if a plurality of bores 42 are provided in an outer circumferential portion of the crank pulley 4, then the weights of the portions where the bores 42 are provided will be reduced, and thus, without providing balance masses on the crank pulley 4, the same effects can be obtained as those which would be obtained if balance masses were provided at portions that are spaced from the bores 42 by 180 degrees in terms of crank angle.

Although, in the above, preferred embodiments of the invention have been described, the present invention is not limited to such embodiments and various modifications are possible. For example, the balance masses and the bores may take other positions and the number of the balance masses may change so long as they generate the same inertial force. Furthermore, the balance masses, the additional weights and bores may take any combination so long as they generate the same inertial force. Furthermore, it is acceptable to use another engine mounting configuration, e.g., engine mounts can be provided at front and rear portions of an associated vehicle in addition to the above-mentioned engine mounts. Furthermore, the present invention can be applied in the same manner to a three cylinder engine in which the firing order is #1 cylinder-#3 cylinder-#2 cylinder.

The invention claimed is:

1. A three cylinder engine comprising:
a crankshaft rotatably mounted;
at least two engine mounts supporting the three cylinder engine on a vehicle body through the at least two engine mounts that are arranged at both opposite ends of the three cylinder engine in a direction that corresponds to a direction of the crankshaft axis of the crankshaft; and
a vibration alleviation unit disposed on at least one of the crankshaft and a part that operates in unison with the crankshaft, the vibration alleviation unit including at least one of a balance mass and a bore on at least one of the crank shaft and the part that operates in unison with the crankshaft, the at least one of the balance mass and the bore being arranged so as to be displaced 90 degrees with respect to a rotation phase of a middle cylinder of the three cylinder engine,
a first of the at least two engine mounts being set with a spring constant $K_v$ in a crankshaft axis pitch direction, and a spring constant $K_H$ in a crankshaft axis yaw direction such that an inequality of $K_v > K_H$ is established,
the vibration alleviation unit being set with respect to the at least one of the crankshaft and the part such that the vibration alleviation unit satisfies an inequality of $0 < M_v / M_{v0} < 0.5$, wherein
$M_v$ represents a primary couple component of a primary couple produced by the three cylinder engine in the crankshaft axis pitch direction, $M_H$ represents a primary couple component of the primary couple produced by the three cylinder engine in the crankshaft axis yaw direction, and $M_{v0}$ represents a sum of the primary couple components $M_v$ and $M_H$.

2. The three cylinder engine as claimed in claim 1, wherein the vibration alleviation unit sets a weight balance of the at least one of the crankshaft and the part to satisfy the inequality of $0 < M_v / M_{v0} < 0.5$.

3. The three cylinder engine as claimed in claim 1, wherein a second of the at least two engine mounts that is on located at an opposite end of the three cylinder engine from the first of the at least two engine mounts is set with a spring constant $K_{v2}$ in a crankshaft axis pitch direction and a spring constant $K_{H2}$ in a crankshaft axis yaw direction, such that an inequality of $K_{v2} > K_{H2}$ is established.

4. The three cylinder engine as claimed in claim 3, wherein
the first of the at least two engine mounts is set to have a transfer sensitivity $H_v$ in the crankshaft axis pitch direction and a transfer sensitivity $H_H$ in the crankshaft axis yaw direction, from among transfer sensitivities of a vibration transferred to the vehicle floor through the first of the at least two engine mounts,
the three cylinder engine is a part of an engine unit that further includes a transmission and parts connected to the three cylinder engine and the transmission, the engine unit producing a moment of inertia $I_v$ of the engine unit in the crankshaft axis pitch direction, and a moment of inertia $I_H$ of the engine unit in the crankshaft axis yaw direction,
the vibration alleviation unit is further set to satisfy a condition of an inequality of $(I_v K_H H_H)/(I_H K_v H_v + I_v K_H H_H) \leq M_v / M_{v0} < 0.5$.

5. The three cylinder engine as claimed in claim 1, wherein
the first of the at least two engine mounts is set to have a transfer sensitivity $H_v$ in the crankshaft axis pitch direction and a transfer sensitivity $H_H$ in the crankshaft axis yaw direction, from among transfer sensitivities of a vibration transferred to the vehicle floor through the first of the at least two engine mounts,
the three cylinder engine is a part of an engine unit that further includes a transmission and parts connected to the three cylinder engine and the transmission, the engine unit producing a moment of inertia $I_v$ of the engine unit in the crankshaft axis pitch direction, and a moment of inertia $I_H$ of the engine unit in the crankshaft axis yaw direction,
the vibration alleviation unit is further set to satisfy a condition of an inequality of $(I_v K_H H_H)/(I_H K_v H_v + I_v K_H H_H) \leq M_v / M_{v0} < 0.5$.

6. The three cylinder engine as claimed in claim 4, wherein
the second of the at least two engine mounts is set to have a transfer sensitivity $H_{v2}$ in the crankshaft axis pitch direction and a transfer sensitivity $H_{H2}$ in the crankshaft axis yaw direction, from among transfer sensitivities of a vibration transferred to the vehicle floor through the second of the at least two engine mounts, and
the vibration alleviation unit is further set to satisfy an inequality of $(I_v K_H H_H)/(I_H K_v H_v + I_v K_H H_H) \leq M_v / M_{v0} \leq (I_v K_{H2} H_{H2})/(I_H K_{v2} H_{v2} + I_v K_{H2} H_{H2})$.

7. The three cylinder engine as claimed in claim 1, wherein the vibration alleviation unit comprises the balance mass that is provided on the crankshaft or the part that includes the vibration alleviation unit.

8. The three cylinder engine as claimed in claim 1, wherein the vibration alleviation unit comprises the bore that is provided in the at least one of the crankshaft and the part.

9. The three cylinder engine as claimed in claim 1, wherein the at least two engine mounts are arranged with respect to the crankshaft such that the crankshaft extends in a vehicle widthwise direction.

* * * * *